3,130,207
IMPROVED EPOXIDATION PROCESS WITH LIQUID ALIPHATIC PEROXY ACIDS
Frank P. Greenspan, Larchmont, N.Y., and Seymour M. Linder, Baltimore County, Md., assignors to FMC Corporation, a corporation of Delaware
No Drawing. Filed Nov. 3, 1960, Ser. No. 66,943
10 Claims. (Cl. 260—348.5)

This invention relates to an improved epoxidation process. More particularly, it relates to an improved method for epoxidizing organic compounds with liquid aliphatic peroxy acids.

Processes for epoxidizing organic compounds with organic peroxy acids are known. These epoxidation processes are conventionally carried out either by forming the peroxy acid in situ or by employing preformed peroxy acid mixtures. In epoxidation processes employing the in situ technique, hydrogen peroxide is added to a mixture containing an organic acid—preferably a lower aliphatic acid—and the olefinic compound to be epoxidized. The reaction is carried out in the presence of a strong acid catalyst. In many cases the in situ procedure for epoxidation is preferred since major economic as well as handling advantages accrue from carrying out the reaction in this manner. However, in other cases the in situ epoxidation procedure is not suitable, since the very conditions which favor the in situ formation of the peroxy acid, namely, high temperature, strong acidity, and long reaction time, are deleterious to the survival of the oxirane ring. Readily hydrolyzed epoxides are not completely stable under the conditions of the in situ procedure, and therefore are generally prepared by epoxidation procedures employing a preformed peroxy acid.

Preformed aliphatic peroxy acids, as conventionally employed in epoxidation reactions, are mixtures containing a liquid aliphatic peroxy acid and water in equilibrium with hydrogen peroxide and the corresponding aliphatic acid. The mixture is prepared by adding a catalytic amount of a strong acid, such as sulfuric acid, to a mixture of hydrogen peroxide and an aliphatic acid, and allowing the mixture to reach equilibrium. If this mixture were to be used directly in the epoxidation reaction, the sulfuric acid present would catalyze the opening of the oxirane ring in the epoxide product to form the undesired glycol or hydroxy acetate. Therefore, an alkaline agent, such as sodium acetate, is usually added to the epoxidation reaction medium to buffer out the adverse effect of the acid catalyst on the epoxide product. However, this buffering prevents further shifting of the equilibrium as the peroxy acid is being used up in the epoxidation reaction, with the result that little or no conversion of the unreacted hydrogen peroxide to additional peroxy acid takes place. Accordingly, this unreacted hydrogen peroxide represents unavailable active oxygen which is normally discarded with the waste liquors from the epoxidation reaction. For example, a 40% solution of peracetic acid contains about 5% hydrogen peroxide, which represents approximately 22% of the total active oxygen originally present in the reaction medium. Thus, over one-fifth of the active oxygen present during the epoxidation reaction is never utilized.

It is an object of this invention to utilize all of the active oxygen present in epoxidation processes employing preformed liquid aliphatic peroxy acids. More particularly, it is an object to utilize the active oxygen present in the hydrogen peroxide which is normally discarded in such preformed peroxy acid epoxidation processes.

We have now discovered a method for utilizing all of the active oxygen present during the epoxidation of epoxidizable organic compounds with preformed liquid aliphatic peroxy acid solutions comprising substantial equilibrium mixtures of aliphatic peroxy acid, aliphatic acid, hydrogen peroxide, and water, without effecting ring-opening of the epoxide product. This result is accomplished by adding a small amount of a liquid aliphatic acid anhydride to the epoxidation reaction medium; surprisingly, the aliphatic acid anhydride does not react with the water present, but reacts preferentially with the hydrogen peroxide present to form additional aliphatic peroxy acid. Hence, substantially less preformed peroxy acid is required than is normally employed, since the process of this invention utilizes the unreacted hydrogen peroxide, heretofore discarded, which contains a substantial amount of the total active oxygen present in the system.

The epoxidizable compound may be any organic compound containing at least one olefinic double bond. By way of example only, it is mentioned that such compounds as unsaturated aliphatic and unsaturated alicyclic hydrocarbons, unsaturated fatty acids and esters, unsaturated alcohols, sterols, and unsaturated polymers are epoxidizable with peroxy acids. The improvement of this invention is particularly applicable to the epoxidation of terpenes and other materials whose epoxides readily hydrolyze under the strongly acidic reaction conditions employed with conventional in situ procedures. Our process is especially suitable for the epoxidation of dicyclopentadiene, cyclohexene, diisobutylene, pentene, limonene, octylene, pinene, polybutadiene, styrene-butadiene copolymers and polycyclopentadiene.

The peroxy acid may be any of the liquid aliphatic peroxy acids. However, based upon economic considerations, the lower aliphatic peroxy acids are preferred. The aliphatic peroxy acids which are particularly suitable are performic, peracetic, perpropionic, perbutyric and perpentanoic acids. Substituted peroxy acids, such as glycolic and chloracetic peroxy acids, are also suitable.

Although peroxy acid mixtures of any concentration may be used in our process, we prefer to use peroxy acid concentrations between 20% and 45% by weight. Mixtures containing less than 20% peroxy acid result in slow epoxidation reaction rates, while mixtures containing more than 45% peroxy acid should be avoided because of their unstable nature. Peroxy acids are normally prepared by mixing hydrogen peroxide with the aliphatic acid and a catalytic amount of a strong acid, such as sulfuric acid. For example, 40% peracetic acid is commercially prepared by mixing 90% hydrogen peroxide with glacial acetic acid and about 1% of sulfuric acid. The resulting equilibrium mixture contains about 40% peracetic acid, about 39% acetic acid, about 15% water, about 5% hydrogen peroxide and about 1% sulfuric acid. When 50% hydrogen peroxide is mixed with glacial acetic acid, the equilibrium mixture contains about 27% peractic acid and about 10% hydrogen peroxide. Peracetic acid is commercially available in various concentrations.

During the preparation of preformed peroxy acid solutions the reaction proceeds relatively slowly as final equilibrium is approached. For example, in preparing 40% peracetic acid by reaction at 25° C., the reaction mixture contains 36% peracetic acid after 2 hours, however the final equilibrium mixture containing 40% peracetic acid is not reached until after an additional 2 hours of reaction. Although it is preferred to use the final equilibrium mixture in the epoxidation reaction, it may be expedient in some cases to use preformed peroxy acid solutions which have not as yet reached final equilibrium. The phrase "substantial equilibruim mixture" is meant to include final equilibruim mixtures, as well as those mixtures which are approaching final equilibrium.

The acid catalyst used in the preparation of the peroxy acid may be any strong acid. Illustrative examples are mineral acids such as sulfuric, nitric, perchloric and fluoroboric acids; strong organic acids, such as p-toluene sulfonic acid, and alkane sulfonic acids, such as methane and ethane sulfonic acids and mixtures thereof; strongly-acidic cation exchange resins such as sulfonic acid, phosphonic acid and phenolic cation exchange resins and acid complexes such as boron trifluoride-ether complexes.

Peroxy acids may also be prepared in such a way that the final equilibrium mixture does not contain any acid catalyst. Such mixtures may be prepared by various expedients such as allowing the aliphatic acid and the hydrogen peroxide to stand for a period of time sufficient to reach equilibrium without the use of an acid catalyst, or by passing the aliphatic acid and hydrogen peroxide through a column containing a cation exchange resin, whereby the effluent is free of the resin catalyst.

The aliphatic acid anhydride employed will ordinarily correspond to the peroxy acid being used, although a different anhydride may be employed, if desired. Any of the liquid aliphatic acid anhydrides are suitable, however the lower aliphatic anhydrides are preferred for economic reasons. The aliphatic acid anhydrides which are particularly suitable are acetic, propionic, butyric and pentanoic anhydrides.

The quantity of alkaline agent required for the improved process taught herein is the amount which is necessary to maintain pH conditions which catalyze the reaction between the anhydride and the hydrogen peroxide, while little or no reaction takes place with the water present in the medium. The amount of alkaline agent present should be sufficient to allow the pH to remain within the range from about 2.5 to 6.5. In the case where no acid catalyst is present, alkaline agent is still necessary to maintain the pH within the desired range.

It is preferable to add the alkaline agent to the reaction medium before any peroxy acid is added, since the peroxy acid may be unstable in the presence of concentrated alkaline agent. Although sodium acetate is the preferred alkaline agent, other basic salts of the alkali and alkaline earth metals such as the carbonates, bicarbonates, phosphates, and borates or the salt form of weakly acidic ion exchange resins may be used. The hydroxides of these metals may also be employed either alone or with another alkaline agent.

The peroxy acid may be added to the reaction medium all at once, or in increments. However, since the epoxidation reaction is highly exothermic, it is preferable to add the acid in increments which allows the reaction to be readily controlled.

The anhydride may be added to the epoxidation medium containing the epoxidizable organic compound before, simultaneously with, or after the peroxy acid has been added. The anhydride should not be added directly to the concentrated peroxy acid mixture, because the anhydride would violently react with the equilibrium mixture. Since the reaction between the anhydride and the hydrogen peroxide is exothermic, it is preferable to add the anhydride in increments after the peroxy acid has been added.

The anhydride is preferably added in the stoichiometric quantity necessary to react with the hydrogen peroxide component of the peroxy acid mixture, although less than the stoichiometric quantity may be used. The use of significantly less than the stoichiometric quantity results in incomplete utilization of the active oxygen in the hydrogen peroxide. Excesses of anhydride should be avoided, because it may lead to the formation of undesired by-products. Anhydride concentrations of about 0.5 to 1.0 of the stoichiometric quantity, based upon the hydrogen peroxide present, give favorable results. The active oxygen content of the reaction medium may be checked periodically by titrating a sample successively with 0.1 N ceric sulfate and 0.1 N sodium thiosulfate. Reaction between the anhydride and hydrogen peroxide is evidenced by a drop of ceric titer (hydrogen peroxide) and a rise in thio titer (peroxy acid). For a discussion of this technique, see Analytical Chemistry, volume 20, page 1061. The epoxidation reaction is allowed to continue until complete utilization of the active oxygen is indicated.

The improved process of this invention is operative under the same conditions as those under which conventional preformed peroxy acid epoxidation reactions take place. The pH during the reaction may vary from about 2.5 to about 6.5, and is preferably in the range of 3 to 6. At a pH below about 2.5, there is insufficient alkaline agent present to neutralize the acid catalyst present in the preformed peroxy acid mixture. At a pH above about 6.5, decomposition of the hydrogen peroxide and the peroxy acid occurs. Although the pH's indicated are the readings obtained on a pH meter by inserting the calomel and glass electrodes into the aqueous phase of the reaction mixture, these values may not be precise because of the primarily non-aqueous nature of the medium.

As in conventional epoxidation processes, the temperature will vary depending upon the compound being epoxidized, the particular peroxy acid being used, and the concentration of the peroxy acid. These epoxidation reactions are generally conducted at temperatures between 0° and 100° C. A particularly suitable range of temperature is from 10° to 65° C., while 25° to 50° C. is preferred. The process can be carried out at atmospheric pressure or at pressures above or below atmospheric.

Solvents have been used in epoxidation reactions for various purposes, such as to dissolve a viscous or solid starting material, to speed up the rate of the reaction or to minimize the ring-opening of the epoxide product. These solvents do not affect the improvement of this invention, and thus may be used, if desired.

The following examples, in which all parts and percentages are by weight, are given to further illustrate the improved epoxidation process of this invention.

*Example 1*

This example illustrates the preparation of dicyclopentadiene dioxide by the epoxidation of dicyclopentadiene. A mixture of 95 parts of dicyclopentadiene and 20 parts of sodium acetate was heated with stirring to 40° C. Two hundred and thirty-six parts of a preformed 40% peracetic acid mixture containing peracetic acid, acetic acid, hydrogen peroxide, water and sulfuric acid were added to this mixture over a period of 2 hours. The temperature was maintained between 40° and 45° C. by cooling. Following the addition of peracetic acid, 35.5 parts of acetic anhydride were added over a period of 30 minutes at the same temperature. When the addition was complete, the reaction mixture was held at 40° to 45° C. for 1.5 hours after which the ceric sulfate and sodium thiosulfate titers levelled off. Five hundred milliliters of water were added and the mixture was neutralized by the gradual addition of 260 parts of 50% sodium hydroxide. The temperature was maintained at 40° to 45° C. and the addition was stopped at a pH of 6.5. The mixture was then cooled to 10° C., filtered, and the solid washed carefully with water to remove the remaining acid. The solid was then vacuum dried at room temperature. A yield of 103 parts (82.5% of theoretical) of dry product having a setting point of 181.7° C. was recovered.

*Example 2*

This example illustrates the preparation of octylene oxide by the epoxidation of octylene. A mixture of 100 parts of octylene (75% octene-2, 25% octene-1) and 7.2 parts of sodium carbonate was heated with stirring to 38° C. One hundred and eighteen parts of a preformed 40% perpropionic acid mixture containing perpropionic acid, propionic acid, hydrogen peroxide, water and sulfuric acid were added to this mixture while keeping the temperature between 38° and 42° C. by cooling. When this addition was complete, 19 parts of propionic anhydride were slowly added. The pH of the reaction was 3.8 and the temperature was maintained between 38° and 42° C.

for 2 hours, after which the ceric sulfate and sodium thiosulfate titers levelled off. The product mixture was washed twice with water and once with a sodium carbonate solution. A yield of 100 parts of octylene oxide (84.4% of theoretical) containing 8.77% oxirane oxygen and having a bromine number of 26 was obtained.

*Example 3*

This example illustrates the preparation of limonene dioxide by the epoxidation of limonene. One hundred and fifty parts of the preformed 40% peracetic acid mixture described in Example 1 were added to a mixture of 100 parts of double distilled limonene, 600 parts of chloroform solvent and 15 parts of sodium acetate, while keeping the temperature between 28° and 32° C. by cooling. Following the addition of peracetic acid, 90 parts of 50% sodium hydroxide were added simultaneously with 86 parts of 40% peracetic acid, care being taken that the added solutions did not mix before entering the reaction mixture. When the simultaneous addition was complete 35.4 parts of acetic anhydride were added and the reaction mixture was then held at 28 to 32° C. for 1.5 hours after which the ceric sulfate and sodium thiosulfate titers levelled off. The product mixture was extracted with an equal volume of water and the upper aqueous layer was discarded. The organic layer was then washed with a dilute solution of sodium carbonate and dried over anhydrous magnesium sulfate. Removal of the chloroform from the dried solution was accomplished by atmospheric distillation followed by vacuum distillation. A yield of 119 parts of product containing 15.3% oxirane oxygen was obtained. This material had a bromine number of 3.0 and contained 2.9% limonene monoxide and 79% limonene dioxide.

*Example 4*

A mixture of 100 parts of octylene (75% octene-2, 25% octene-1) and 22 parts of sodium acetate was heated to 38° C. with stirring. One hundred parts of a preformed 40% peracetic acid mixture containing peracetic acid, acetic acid, hydrogen peroxide, water and sulfuric acid were added to this mixture while keeping the temperature between 38° and 42° C. by cooling. When this addition was complete, 15 parts of acetic anhydride were slowly added. The pH of the reaction medium was 4.2 and the temperature was maintained between 38° and 42° C. for 2 hours, after which the ceric sulfate and sodium thiosulfate titers levelled off. The product mixture was washed twice with water and once with a sodium carbonate solution. A yield of 101 parts of octylene oxide (86.1% of theoretical) containing 8.82% oxirane oxygen and having a bromine number of 30 was obtained.

*Example 5*

One hundred parts of polybutadiene having a molecular weight of approximately 1000 and a viscosity at 25° C. of 12.5 poises were dissolved in one hundred parts of benzene and heated to 40° C. While maintaining this solution at a temperature between 40° and 45° C., 180 parts of the preformed 40% peracetic acid mixture used in Example 1 and 63 parts of 50% aqueous sodium hydroxide were added simultaneously over a period of one hour, followed by 23 parts of acetic anhydride. After four additional hours of reaction at 40° to 45° C. the reaction mixture was neutralized and the aqueous phase discarded. The oil phase was washed several times with water, azeotropically distilled free of water and finally distilled free of solvent under vacuum to yield 107 parts of epoxypolybutadiene containing 9.03% oxirane oxygen.

*Example 6*

One hundred parts of thermally-polymerized polycyclopentadiene consisting mainly of trimer, tetramers and pentamers were dissolved in one hundred parts of benzene and heated to a temperature of 40° C. While maintaining this solution at 40° to 45° C., 180 parts of the preformed 40% peracetic acid mixture described in Example 1 and 63 parts of 50% aqueous sodium hydroxide were added simultaneously over a period of one hour, followed by the addition of 23 parts of acetic anhydride. After four additional hours of reaction at 40° to 45° C., the reaction mixture was neutralized and the aqueous phase discarded. The oil phase was washed several times with water, azeotropically distilled free of water and finally distilled free of solvent under vacuum to yield 95 parts of a waxy solid containing 8.33% oxirane oxygen.

*Example 7*

One hundred parts of 80/20 butadiene-styrene copolymer prepared by sodium-catalyzed polymerization were dissolved in one hundred parts of benzene and heated to 40° C. While maintaining this solution at 40° to 45° C., 180 parts of the preformed 40% peracetic acid mixture described in Example 1 and 63 parts of 50% aqueous sodium hydroxide were added simultaneously over a period of one hour, followed by the addition of 23 parts of acetic anhydride. After four additional hours of reaction at 40° to 45° C. the reaction mixture was neutralized and the aqueous phase discarded. The oil phase was washed several times with water, azeotropically distilled free of water and finally distilled free of solvent under vacuum to give 113 parts of a viscous semi-solid resin containing 8.5% oxirane oxygen.

*Example 8*

Preformed peracetic acid was prepared by reacting 50% hydrogen peroxide with acetic acid in the presence of a sulfonated styrene divinylbenzene copolymer cation exchange resin, as catalyst. Eighty-four parts of the resin, which contained approximately 45% water, were first washed with acetic acid and dried to remove the bulk of the water and then mixed with 100 parts of glacial acetic acid. The mixture was heated with stirring to 40° C. and 76 parts of 50% hydrogen peroxide were added over a period of 25 minutes, keeping the temperature at 39° C. Periodic titers with ceric sulfate and sodium thiosulfate indicated that the reaction was complete in approximately one hour. The mixture was then cooled to room temperature and the peracetic acid solution decanted from the resin. The resulting preformed peracetic acid contained 22.6% peracetic acid and 8.8% hydrogen peroxide.

One hundred and twenty-three parts of 22.6% peracetic acid, as prepared above, were slowly added to a mixture of 100 parts of caprylene (75% octene-2, 25% octene-1) and 5.1 parts of anhydrous sodium acetate with stirring, while maintaining the temperature between 38° and 42° C. When this addition was complete, 32 parts of acetic anhydride were slowly added at the same temperature. The total addition time was approximately one hour. The ceric sulfate and sodium thiosulfate titers indicated that the reaction was complete two hours after the end of the addition of the reactants. The pH of the aqueous layer was 3.0. A yield of 91 parts of octylene oxide (84% of theoretical) containing 7.6% oxirane oxygen and having a bromine number of 31 was obtained.

Although the principles of this invention have been explained and exemplified in such manner that the invention can be readily understood and practiced by those skilled in the art, it is to be understood that various modifications and changes may be made from the specific illustrations and examples given in the present specification without departing from the spirit of the invention or the scope of the following claims.

We claim:

1. In the process of epoxidizing an organic compound containing at least one epoxidizable olefinic double bond selected from the group consisting of unsaturated aliphatic hydrocarbons, unsaturated alicyclic hydrocarbons, unsaturated fatty acids, unsaturated fatty esters, unsaturated alcohols, sterols, and unsaturated polymers by reacting said organic compound with a preformed liquid aliphatic peroxy acid solution comprising a substantial equilibrium mixture of liquid aliphatic peroxy acid, liquid aliphatic acid, hydrogen peroxide, and water, said equilibrium mixture being formed by the reaction of liquid aliphatic acid and hydrogen peroxide and having a liquid aliphatic peroxy acid concentration of 20–45% by weight, at a temperature of 0–100° C., the improvement which comprises conducting the reaction in the presence of sufficient liquid aliphatic acid anhydride to react preferentially with the hydrogen peroxide present in the equilibrium mixture to form additional liquid aliphatic peroxy acid, while maintaining the pH of the reaction medium in the range of 2.5–6.5.

2. In the process of epoxidizing an organic compound containing at least one epoxidizable olefinic double bond selected from the group consisting of unsaturated aliphatic hydrocarbons, unsaturated alicyclic hydrocarbons, unsaturated fatty acids, unsaturated fatty esters, unsaturated alcohols, sterols and unsaturated polymers by reacting said organic compound with a preformed liquid aliphatic peroxy acid solution consisting essentially of a substantial equilibrium mixture of liquid aliphatic peroxy acid, liquid aliphatic acid, hydrogen peroxide, water, and an acid catalyst, said equilibrium mixture being formed by the reaction of liquid aliphatic acid and hydrogen peroxide in the presence of an acid catalyst and having a liquid aliphatic peroxy acid concentration of 20–45% by weight, at a temperature of 0–100° C., the improvement which comprises conducting the reaction in the presence of sufficient liquid aliphatic acid anhydride to react preferentially with the hydrogen peroxide present in the equilibrium mixture to form additional liquid aliphatic peroxy acid, while maintaining the pH of the reaction medium in the range of 2.5–6–5.

3. In the process of epoxidizing an organic compound containing at least one epoxidizable olefinic double bond selected from the group consisting of unsaturated aliphatic hydrocarbons, unsaturated alicyclic hydrocarbons, unsaturated fatty acids, unsaturated fatty esters, unsaturated alcohols, sterols and unsaturated polymers by reacting said organic compound with a preformed lower aliphatic peroxy acid solution consisting essentially of a substantial equilibrium mixture of lower aliphatic peroxy acid, lower aliphatic acid, hydrogen peroxide, water, and a mineral acid catalyst, said equilibrium mixture being formed by the reaction of lower aliphatic acid and hydrogen peroxide in the presence of a mineral acid catalyst and having a lower aliphatic peroxy acid concentration of 20–45% by weight, at a temperature of 10–65° C., the improvement which comprises conducting the reaction in the presence of sufficient lower aliphatic acid anhydride to react preferentially with the hydrogen peroxide present in the equilibrium mixture to form additional lower aliphatic peroxy acid, while maintaining the pH of the reaction medium in the range of 2.5–6.5.

4. In the process of epoxidizing an organic compound containing at least one epoxidizable olefinic double bond selected from the group consisting of unsaturated aliphatic hydrocarbons, unsaturated alicyclic hydrocarbons, unsaturated fatty acids, unsaturated fatty esters, unsaturated alcohols, sterols and unsaturated polymers by reacting said organic compound with a preformed peracetic acid solution consisting essentially of a substantial equilibrium mixture of peracetic acid, acetic acid, hydrogen peroxide, water, and sulfuric acid, said equilibrium mixture being formed by the reaction of peracetic acid and hydrogen peroxide in the presence of sulfuric acid and having a peracetic acid concentration of 27–40% by weight, at a temperature of 25–50° C., the improvement which comprises conducting the reaction in the presence of sufficient sodium acetate to maintain the pH of the reaction medium in the range of 2.5–6.5, and sufficient acetic anhydride to react preferentially with the hydrogen peroxide present in the equilibrium mixture to form additional peracetic acid.

5. The improved process of claim 4, in which said organic compound is dicyclopentadiene.

6. The improved process of claim 4, in which said organic compound is octylene.

7. The improved process of claim 4, in which said organic compound is limonene.

8. The improvement process of claim 4, in which said organic compound is polybutadiene.

9. The improved process of claim 4, in which said organic compound is polycyclopentadiene.

10. The improved process of claim 4, in which said organic compound is a copolymer of butadiene and styrene.

References Cited in the file of this patent

UNITED STATES PATENTS

| | | |
|---|---|---|
| 2,377,038 | Reichert et al. | May 29, 1945 |
| 2,676,131 | Soloway | Apr. 20, 1954 |
| 2,836,605 | Rowland et al. | May 27, 1958 |

OTHER REFERENCES

Bergmann: The Chemistry of Acetylene and Related Compounds, page 80, Interscience Publishers, Inc., New York, 1948.